Figure 1:
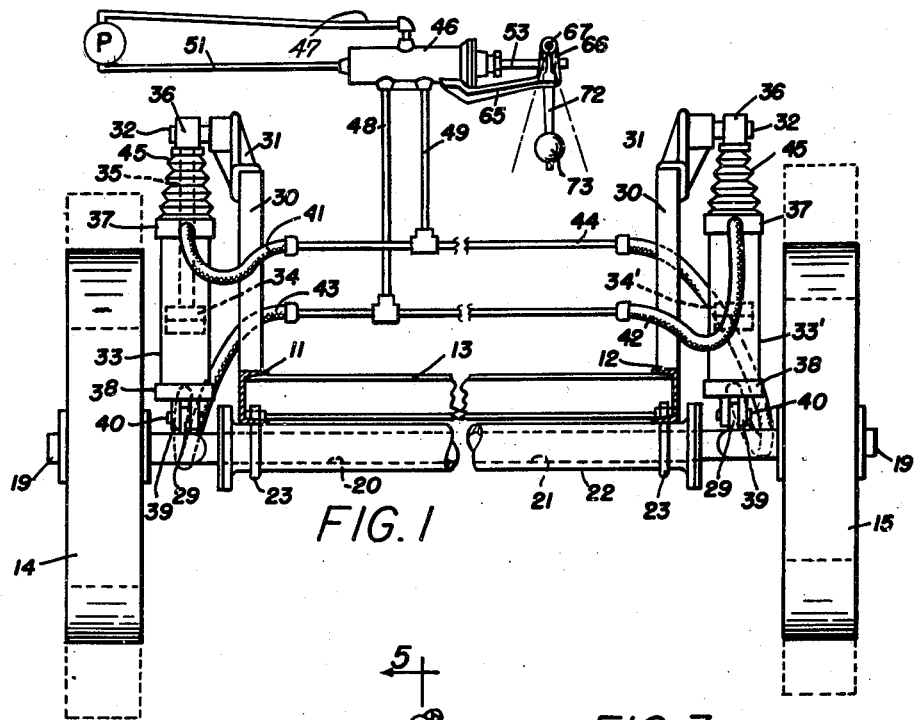

March 31, 1942. H. KRAMER 2,278,081
LEVELING MECHANISM
Filed Sept. 29, 1939  2 Sheets-Sheet 1

HAROLD KRAMER
Inventor

By Herbert E. Smith
Attorney

March 31, 1942.  H. KRAMER  2,278,081
LEVELING MECHANISM
Filed Sept. 29, 1939  2 Sheets-Sheet 2
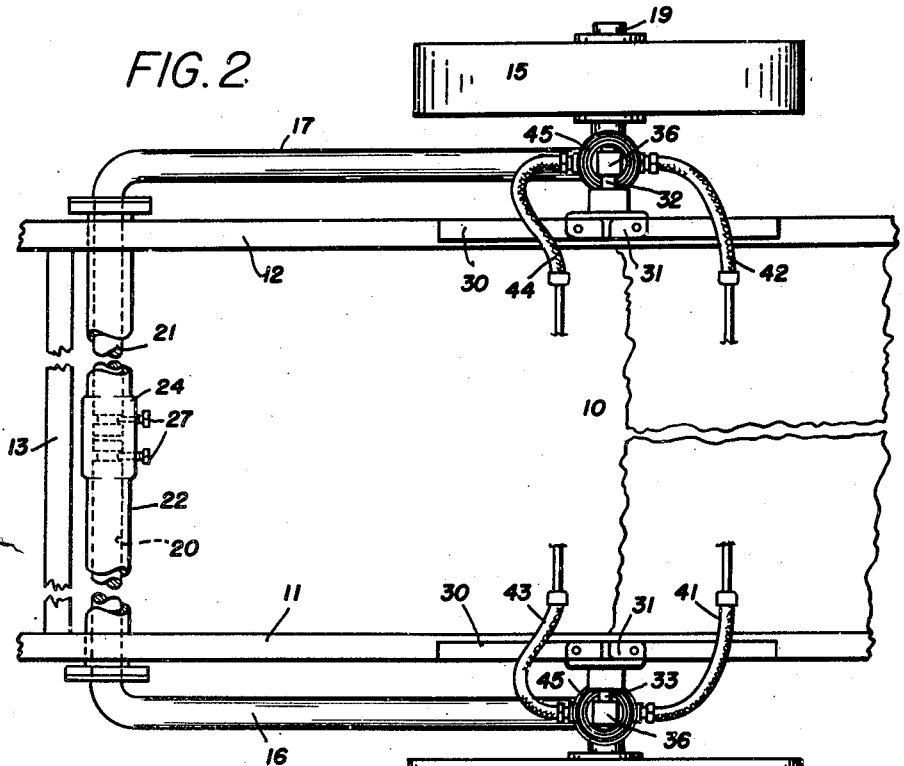
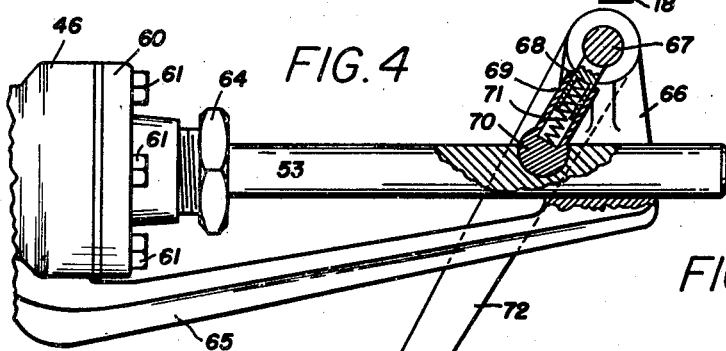
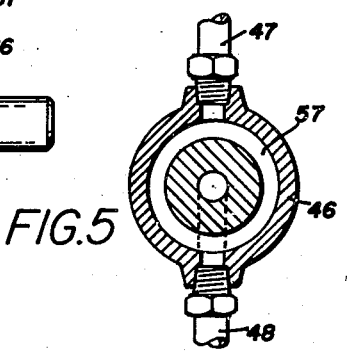
HAROLD KRAMER
Inventor
By Herbert E. Smith
Attorney Patented Mar. 31, 1942

2,278,081

UNITED STATES PATENT OFFICE 2,278,081

LEVELING MECHANISM

Harold Kramer, Odessa, Wash., assignor of one-half to Elmer H. Hays, Spokane, Wash.

Application September 29, 1939, Serial No. 297,101

8 Claims. (Cl. 280—6)

My present invention relates to a leveling mechanism for movable vehicles, as well as stationary machines, wherein is employed a frame for supporting machinery which must be maintained upon a substantially horizontal plane. A typical installation may be in harvesting machinery. This type of machinery is constructed for level land harvesting and for side hill harvesting, and under either condition it is imperative that the separator unit be maintained at all times on a level gear.

In certain portions of the farming area grain is grown upon the relatively steep hillsides as well as upon the level land. In manufacturing equipment for side hill farming the manufacturer often provides it with a leveling or compensating mechanism so that the framework supporting the separator unit can be leveled. The usual practice is to provide a rack and pinion arrangement which is manually operated by a workman upon the harvester to raise or lower the frame on the downhill side to cause it to be level. Certain attempts have also been made to employ hydraulic cylinders for supporting the frame above the wheels and axles, which cylinders can be operated with power produced from a suitable pumping mechanism to cause the frame to be raised or lowered. Mechanical leveling and the early attempts at hydraulic leveling have always necessitated the assignment of a workman to attend to the leveling operation, and to the best of my knowledge no device has been perfected which operates automatically as the vehicle is drawn over the ground.

It is therefore an important object of my invention to provide a simply constructed, easily operated side hill leveling mechanism for combine harvesters or for other mechanisms where such compensation is necessary.

Another object of my invention is to provide a leveling device which is automatic and eliminates the necessity of constant attention by a workman.

A further object of the invention resides in the provision of a leveling device which has a dual function, namely the raising of one side while at the same time the opposite side of the frame is lowered, to produce the desired compensating operation.

Still another object of the invention has been to provide an automatically operating leveling valve for my device which is simple to construct and to maintain in operation.

A still further object of the device is to provide a leveling device which may be installed on a level land machine so that it may be converted to operate as a side hill harvester.

Another object of the invention is to provide a leveling device which employs fluid pressure to operate it in substitution for the unwieldy mechanical constructions heretofore used.

Other objects and advantages of the invention will be apparent during the course of the following description.

Figure 3:
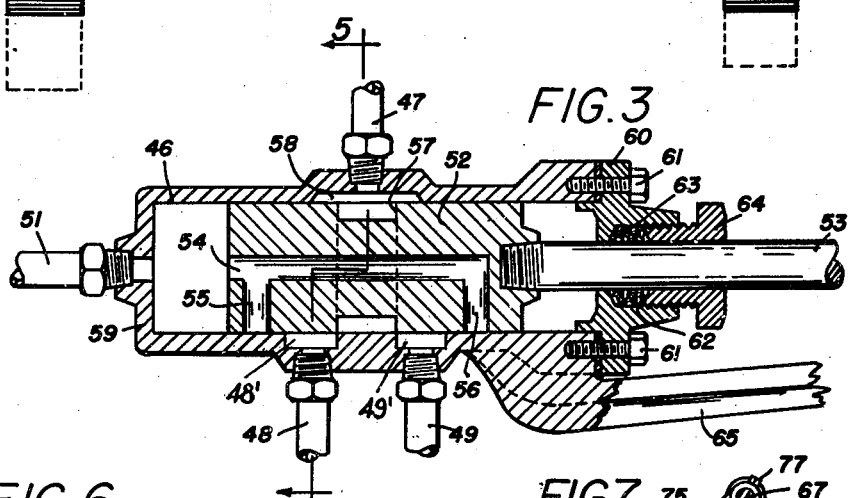
Figure 6:
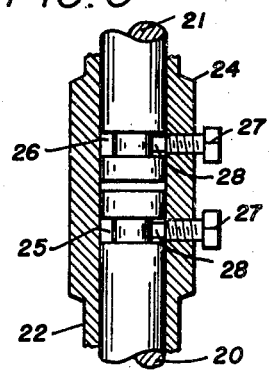
Figure 7:
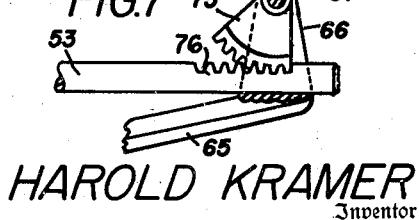

In the drawings, wherein I have shown a preferred embodiment of my invention, and in which like numerals refer to like parts throughout the same, Figure 1 is a cross sectional view through the frame of the separator unit for combine harvesters showing in elevation the operating units of my leveling device, Figure 2 is a plan view, with portions broken away for convenience of illustration, of the rear end of a combine harvester with my side hill leveling mechanism attached thereto, Figure 3 is a vertical cross sectional view of the valve mechanism employed in connection with my leveling device, Figure 4 is an elevational view of the valve-actuating mechanism with portions broken away for convenience of illustration, Figure 5 is a cross section of the control valve of Figure 3, the plane of the section being taken along line 5—5 of Figure 3, Figure 6 is a detail sectional view of a portion of the lateral axle-supporting tube and indicating the manner in which the bell crank axles are secured therein in a rotatable manner, and Figure 7 illustrates a modified valve-actuating mechanism which may be employed to operate the valve of Figure 3.

It is customary in harvesting mechanisms for the threshing of grain to provide a framework for supporting the separator mechanism, which frame is supported above the ground by ground-engaging members adapted to be raised or lowered selectively for varying the relation of the frame with said members.

My invention relates to the use of hydraulically expansive cylinders disposed between the frame of the separator unit and the ground-engaging members, which cylinders are connected in a circuit which includes a gravity actuated, automatically operable valve and a constantly operating supply pump for producing a continuous pressure of hydraulic fluid. It is to be understood that while my description relates to the use of a leveling mechanism upon harvesters I do not wish to be limited to that specific installation, but that my invention is equally applicable to many other types of vehicles to produce advantageous results. I have chosen to describe my invention as though it were installed upon a harvester, as in my locality this would be a typical and very well worthwhile use to which the invention is adaptable.

Reference to Figures 1 and 2 will disclose a harvester body 10 supported upon side frame members 11 and 12 which may be tied together by a cross bar 13. Ordinarily, ground wheels 14 and 15 are provided at either side of the frame and parallel thereto, which members are mounted for rotation upon bell crank axle units 16 and 17 respectively, which at their rear ends have stub axles 18 and 19 and on their forward ends pivot arms 20 and 21. A lateral tube 22 is secured to the under side of the frame members 11 and 12 by means of U-bolts 23—23, and the exterior central portion of the cross tube 22 is enlarged at 24.

The inner ends of the arms 20 and 21 are provided with annular grooves 25 and 26, and dog point set screws 27—27 having dogs 28 are threaded into the enlarged portion of the tube 24 so that the dogs 28 engage in the grooves 25 and 26 to retain the arms in place and at the same time permit rotation of the crank arms around the longitudinal axis of the tubes.

Adjacent the bend in the bell crank axle units 16 and 17, at their juncture with the stub axles 18 and 19, I provide upstanding lugs 29. Erected upon the frame members 11 and 12 is a superstructure 30 which supports a bracket 31 and a swivel pin 32. A cylinder 33 having an interior piston 34 and a piston rod 35 attached thereto is supported from the pin 32 by the pivot eye 36. The ends of the cylinder are closed by caps 37 and 38, and the lower cap 38 has a pair of spaced ears 39—39 which fit on either side of the lug 29 and pivot on the pin 40. Flexible tubes 41 and 42 communicate with the upper portion of the cylinders 33, and similar tubes 43 and 44 communicate with the lower portion of the cylinders.

To protect the piston rod 35 from dust, and to guard it against undue wear, I provide a conventional bellows member 45 which attaches on its lower end to the cylinder cap 37 and on its upper end to the eye or boss 36.

The automatic valve employed in connection with my hydraulically operated leveling cylinders includes a valve housing 46 having connected thereto a constant fluid pressure conduit 47 and at the opposite side, extending therefrom, distributing conduits 48 and 49 attached at opening 48' and 49', respectively. When my valve is centered in the neutral position, a relief valve in the pump supply line will open and permit the fluid to return to the pump P through a by-pass. The conduit 51 communicates with the left end of the housing 46 and conducts the fuel oil being discharged from one or the other of the cylinders back to the pump P on its intake side.

Referring now to Figure 3, in the housing 46 is a slide valve member 52 having attached at one end the valve rod 53, and in its interior I form a longitudinal exhaust duct 54 having lateral passages 55 and 56. Around its central portion I form an annular depression 57. Adjacent the inlet point of attachment of the conduit 47 in the housing 46 I form an elongated distributing chamber 58. The valve housing 46 is formed with a closed end 59, and the open end is closed by means of the cap 60 which is secured in place by bolts 61—61. In the cap 60 is formed a packing chamber 62 that is filled with the usual compressible packing 63 that is held under compression by means of the gland nut 64.

An arm extension 65 extends from one side of the housing 46 and supports on its outer end the valve-actuating mechanism of Figure 4. A pair of upstanding ears 66 stand above the end of the arm 65 and support a cross shaft 67. A laterally disposed pin 68 is secured to the shaft 67 and co-acts with the bushing 69 having a ball head 70 on its lower end. A spring 71 operates between the arm 68 and the closed end of the bushing 69 to normally keep them under an expansible pressure. The ball head 70 is seated in a mating depression in the shaft 53 and the pressure applied lengthwise by the spring 71 keeps the head firmly in its seat.

To one of the outer ends of the shaft 67 I attach the pendulum arm 72 having a weight 73 secured on its lower end by means of a screw 74. When the supporting machine, including the implement frame, is tipped from the horizontal frame, the pendulum 73 swings due to the effect of gravity upon it. This causes the arm 72 to rotate the shaft 67 and through the action of the pin 68 and the round-head bushing 69, the shaft 53 is urged in the direction the pendulum arm has been swung. As the frame is automatically leveling through the flow of oil thus established to the leveling cylinders, the pendulum gradually brings the arm 53 and the valve 52 into the neutral position and the flow of fluid to the cylinders ceases until the vehicle encounters another sloping surface.

In Figure 7 I show a slightly modified form of the valve-actuating mechanism in which the shaft 67 has fixed thereto the toothed gear segment 75, the teeth of which engage the teeth 76 formed in the upper surface of the rod 53. A pendulum arm as 72 is attached to the shaft 67 to operate it as previously described. The gear segment 75 is retained on the shaft 67 in adjusted position by means of the set screw 77.

In operation, my device, as the harvester rolls over the ground on its supporting ground members or wheels 14 and 15, is sensitive to the changes in the contour of the ground, and a movement of the pendulum arm 72 will cause the valve to shift to the left or the right, depending upon the slope of the ground. Let us assume that the pendulum in Figure 1 swings to the right. In this instance the annular ring depression 57 registers with the opening 49' in the housing 46 communicating with the conduit 49. Oil under pressure is supplied then from the pump to the conduit 47 around the valve body 52 and out the opening 49' to the conduit 49 to be distributed to the top of the left-hand cylinder 33 through the top flexible connection 41 and to the bottom of the right-hand cylinder 33' through the flexible tube 44. When the oil starts flowing into the conduit 49, the conduit 48 and the opening 48' in the housing 46 adjacent will be in communication with the lateral passage 55, and the oil flows through that passage into the exhaust conduit 54 thence out through the conduit 51 and back to the pump. Slight movement will register the supply conduit 47 with either conduit 48 or 49, and subsequent movement is necessary to permit evacuation of the contracting chambers to occur through the passages 55 and 54, or the passages 56 and 54 whichever may be registered depending upon the direction of the slope of the ground surface.

It will be apparent that such an operation will cause the piston 34' in the cylinder 33' to rise from the position shown in Figure 1, thus raising the frame member 12 with relation to the ground surface under the wheel 15 and that at the same time the piston 34 in the cylinder 33 will be permitted to travel downwardly in the cylinder, thus lowering the frame member 11 with relation to the ground surface over which the wheels are passing. The opposite action is obtained when the pendulum arm 72 swings to the left in Figure 1. In this way the frame of the harvester is quickly brought onto a level plane, and as the frame becomes level it will be understood that the arm 72 will again assume a perpendicular position which is at right angles to the horizontal frame of the vehicle and the valve is returned to the neutral position ready to operate upon the next change in the ground contour.

It is to be pointed out that any operation of the valve which actuates the pistons within the cylinders is in effect a lengthening or a shortening of the distance between the swivel pins 32 and the lugs 29. If oil under pressure is introduced to the under side of the pistons 34 or 34', thus lengthening this distance, the stub axles 18 and 19 serve as a footing upon which the frame member next adjacent the piston being operated will be raised, and the end 20 or 21 of the bell crank axle 16 or 17 will swivel in the cross housing 22, and it is to be understood that if one side of the frame is being raised the other side will be correspondingly lowered.

The valve rod 53 is actuated as shown in Figure 4 by means of the pin 68 extending at right angles to the cross shaft 67, and due to the fact that the travel of the piston rod produces a condition wherein the distance between the bearing point on the rod and the center of the shaft 67 is longer I have provided the bushing 69 having a ball head 70 which is under pressure produced by the spring 71 and which will automatically lengthen and contract to at all times maintain a positive connection between the shaft 67 and the rod 53.

The showing in Figure 7 describes a modified valve rod operating mechanism, and in this instance as the rod travels to the left or the right the teeth of the segment 75 rock on the teeth 76 of the rod 53.

Under certain circumstances I have found that the use of the expansible cylinder 33 on both sides of the vehicle may be dispensed with where the ground conditions are relatively sloping as compared with the steeper conditions encountered on other farms. In such a case the single cylinder may be attached to one side of the vehicle in the manner hereinbefore disclosed and be controlled by a gravity actuated valve, while the wheel on the opposite side of the machine and its axle are maintained in a fixed or immovable position with relation to the frame member. With this arrangement, too, the double acting piston in the cylinder 33 will level the frame 11 and 12 by permitting the frame to lower with relation to the wheel adjacent the cylinder when the slope is upward toward the side on which the cylinder is attached, or by expanding the cylinder which lifts the piston when the slope is downward toward the side on which the cylinder is attached.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus fully described my invention, what I claim as new and desire to secure by Letters Patent is:

1. In a harvesting vehicle having a frame supporting bell crank axles and wheels journaled for rotation on said axles, a hydraulic leveling device comprising cylinders having expansible chambers and also pivotally attached between said axles and said frame for variable vertical spacing of said axles with relation to said frame, a gravity actuated hydraulic supply valve connected to said cylinders so that operation of the valve to one side will permit the influx of hydraulic fluid to the top of one of said cylinders and to the bottom of the other of said cylinders while at the same time permitting the efflux of discharged hydraulic fluid from said cylinders.

2. In a vehicle having a frame, means for mounting a pair of wheels for variable vertical spacing with respect to said frame, an hydraulic leveling mechanism comprising an expansible chamber between each of said wheels and said frame for varying the vertical spacing of said wheels, means for expanding one of said chambers while simultaneously contracting the other of said chambers, including a slide valve controlling the operation of said chambers and comprising a valve housing having an arm extension, hydraulic supply and distribution conduits communicating from supply means to the chamber in said housing, and to said expansible chambers, a slide member within said housing and having a valve rod, a cross shaft supported at the outer end of said arm extension, an arm between said cross shaft and said valve rod, and an actuating pendulum for imparting pivotal motion to said cross shaft to variably register the slide member with said supply and distribution conduits to direct the flow of hydraulic fluid to and from said expansible chambers.

3. In a vehicle having a frame, means for mounting a pair of wheels for variable vertical spacing with respect to said frame, an hydraulic leveling mechanism comprising an expansible chamber between each of said wheels and said frame for varying the vertical spacing of said wheels, means for expanding one of said chambers while simultaneously contracting the other of said chambers, including a slide valve controlling the operation of said chambers and comprising a valve housing having an arm extension, hydraulic supply and distribution conduits communicating from supply means to the chamber in said housing and to said expansible chambers, a slide member within said housing and having a valve rod, a cross shaft supported at the outer end of said arm extension; an expansible lever between said cross shaft and said valve rod comprising a lateral pin on said cross shaft, a bushing engaging said lateral pin and having a pivotal connection to said valve rod, and an expansion spring between said lateral pin and said bushing; and an actuating pendulum for imparting pivotal motion to said cross shaft to variably register the slide member with said supply and distribution conduits to direct the flow of hydraulic fluid to and from said expansible chambers.

4. In a vehicle having a frame, means for mounting a pair of wheels for variable vertical spacing with respect to said frame, an hydraulic leveling mechanism comprising an expansible and contractible chamber between each of said wheels and said frame for varying the vertical spacing of said wheels, means for expanding one of said chambers while simultaneously contracting the other of said chambers, said means including a slide valve controlling the operation of said chambers and comprising a valve housing forming a valve chamber, having an arm extension, hydraulic supply and distribution conduits secured to said housing and communicating with said chamber, a slide member within said housing and having a valve rod, a gear rack on the outer end of said valve rod, a cross shaft supported at the outer end of said arm extension, a gear segment on said cross shaft and meshing with the gear rack on said valve rod, and an actuating pendulum for imparting pivotal motion to said cross shaft to variably register the slide member with said supply and distribution conduits to direct the flow of hydraulic fluid to and from said expansible chambers.

5. In a vehicle having a frame and superstructure erected on either side, each superstructure being associated with a bell crank axle independently mounted on the frame for separate pivotal action, and having a wheel journaled for rotation thereon; a leveling mechanism comprising a pair of cylinders, each cylinder having pairs of opposed expansible chambers and being pivotally joined to the axle and to the associated superstructure, means for supplying a fluid under pressure to a chamber of each cylinder, and gravity actuated means for controlling the influx of said fluid under pressure to said chambers while simultaneously controlling the efflux of the fluid discharged from the other chambers of each cylinder.

6. In a vehicle having a frame and superstructure erected on either side, each superstructure being associated with a bell crank axle independently mounted on the frame for separate pivotal action, and having a wheel journaled for rotation thereon; a leveling mechanism comprising a pair of hydraulic cylinders, each cylinder having a piston dividing the cylinder into pairs of opposed expansible chambers and said cylinder being pivotally connected to a bell crank axle adjacent a wheel, a piston rod attached to each piston and also pivotally attached to said superstructure, means for supplying hydraulic fluid under pressure to the upper expansible chamber of one cylinder and at the same time to the lower expansible chamber of the other cylinder, and gravity actuated means for controlling the influx of said fluid to said chambers while simultaneously controlling the efflux of the fluid discharged from the other chambers of each cylinder.

7. In a vehicle having a frame with a superstructure erected thereon and also having a bell crank axle pivotally supported from said frame and said axle mounting a wheel for rotation and for variable vertical spacing with relation to said frame, an hydraulic leveling mechanism comprising a pair of hydraulic chambers pivotally attached to said axle and said superstructure, means for supplying fluid under pressure to said chambers, and a valve including a slide member under gravity actuation for controlling the expanding of one of said chambers while at the same time controlling the contracting of the other of said chambers.

8. In a vehicle for side-hill harvesting having a frame supporting a body and also having a pair of bell crank axles and a ground-engaging member mounted on each axle for variable vertical adjustment relative to said frame, an hydraulic leveling mechanism comprising a pair of hydraulic chambers interposed between each ground-engaging member and said frame, means for supplying a fluid under pressure to said hydraulic chambers, and a valve including a slide member under gravity actuation for controlling the flow of fluid to one chamber of each pair while at the same time permiting the efflux of fluid from the other chamber of each pair.

HAROLD KRAMER.